April 1, 1958     J. R. HOPKINS ET AL     2,828,800
METHOD OF AND PRODUCT FOR COATING JOINTS OF PIPE
Filed Aug. 3, 1956
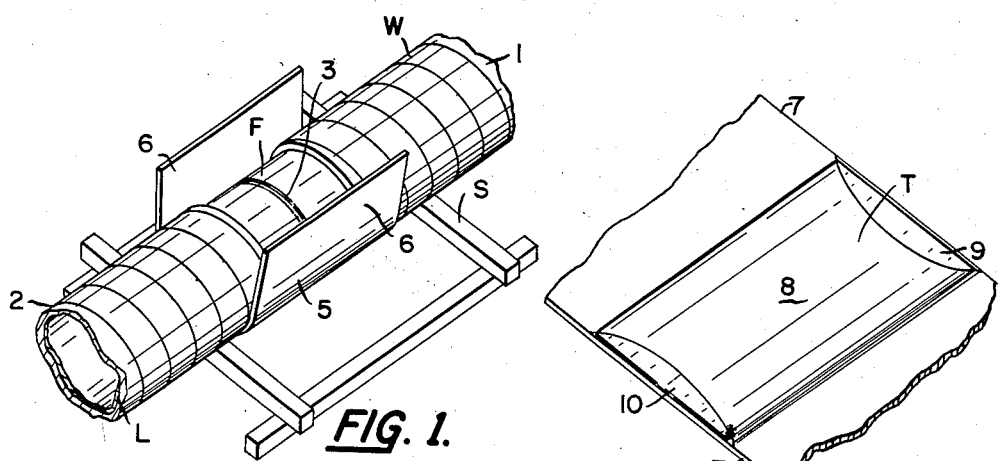
*FIG. 1.*
*FIG. 3.*
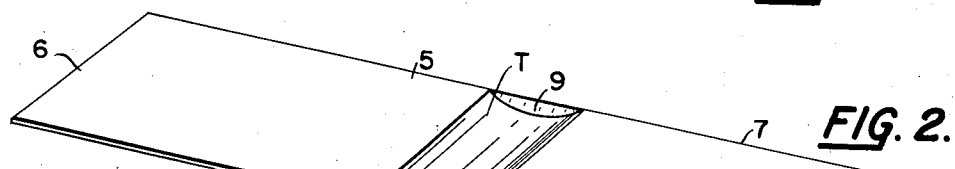
*FIG. 2.*
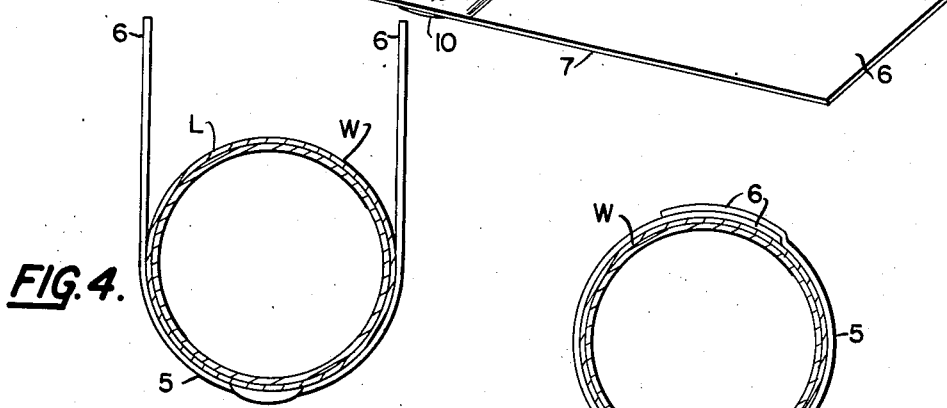
*FIG. 4.*
*FIG. 5.*
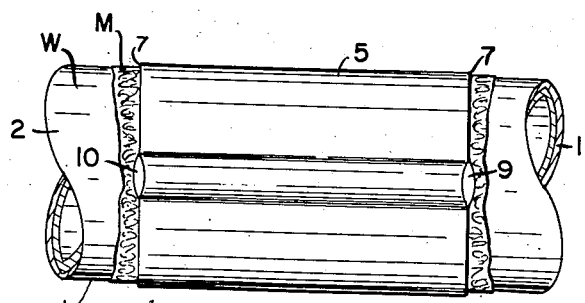
*FIG. 6.*
*INVENTORS.*
JOHN R. HOPKINS
FRANK E. McNULTY
BY *Philip H. Sheridan*
*ATTORNEY*

United States Patent Office 2,828,800
Patented Apr. 1, 1958

2,828,800

METHOD OF AND PRODUCT FOR COATING JOINTS OF PIPE

John R. Hopkins, Denver, Colo., and Frank E. McNulty, Tulsa, Okla.

Application August 3, 1956, Serial No. 601,986

10 Claims. (Cl. 154—41)

This invention relates to an improved method of and product for protecting and coating cylindrical pipes and particularly field joints of pipe which is to be installed under ground, such as in pipe lines for transmitting fluid or gas from one point to another.

Pipe lines that are to be installed under ground by gas, oil and water companies are very often sent to a coating mill or yard where the pipe is cleaned, primed, coated and wrapped with hot applied coal tar coating, asphalt coating, or a micro crystalline wax coating. After the pipe is thus treated or coated it is referred to as "mill coated" or "yard coated" pipe. This coating, which will hereinafter be identified as the wrapping, may be reinforced and there are various specifications regarding the type and thickness of the coating material and the reinforcement. For a disclosure of suitable wrapping, attention is directed to our co-pending U. S. patent application Serial No. 493,244 filed March 9, 1955 and entitled "Method of Applying a Protective Wrapping to a Pipe."

To form such a pipe line, various sections of pipe have to be joined together and it has been the practice to so wrap all of each section in the manner described in said application, with the exception of about four to sixteen inches at the end of each pipe section, this range depending upon the diameter of the pipe. The practice of leaving the ends uncoated is followed by all coating applicators and the length of uncoated section is often specified by the company having the wrapping applied. The sections are usually joined by welding and if the wrapping were applied at the ends of the pipe sections that are so welded, then the heat from welding would precipitate back into the pipe and cause the wrapping adjacent the ends of each section to melt. This latter action would result in poor and difficult welding and the wrapping adjacent the weld would become so hot that portions of it would be destroyed by run-off onto the ground and the remaining portions would often burn and cause considerable expense in rewelding, cleaning and recoating. Therefore, the practice has been to leave certain areas of the ends of each pipe section uncoated and these areas are known in the trade as "cut backs." When the two pieces of pipe are welded together, the weld and the two abutting cut-backs are always referred to as a "field joint" and this terminology will be used hereinafter in describing the present invention and defining the invention by the appended claims.

Many gas, oil and water companies require the contractor or their own personnel to heat up the same type of basic material which forms the wrapping for the majority of each pipe section and to pour this coating material, which would be compatible with the wrapping, over the field joint. Such practice is and has been extremely difficult and inefficient and it is quite a task to get an even amount of coating over the entire field joint and the end results provide a rather poor quality of coating on the field joint. Furthermore, the practice of pouring material, such as hot tar, asphalt or wax, over the field joint involves considerable expense, due to the fact that most of the coating material runs off the pipe onto the ground where it is difficult, if not impossible, to reclaim. Also, it is preferable to have coating reinforcement, such as glass mat or woven glass fabric, at the field joint and this is a difficult and impractical operation as the poured material will solidify so rapidly it is impossible to properly embed the reinforcement therein. There are available commercially special products designed for coating a field joint and which overcome many of the said difficulties encountered in just pouring on the joint. As an example of such, reference is made to our U. S. Patent No. 2,794,483 and entitled "Preformed Product for Protecting and Coating Field Joints of Pipes," such a product being generally satisfactory except for the expense involved.

The present invention is concerned with the provision of an improved and simplified protective coating for field joints in particular comprising a product that is preformed so that the coating applicator may wrap the product around the field joint and be insured that the hot coating applied just before such wrapping covers the entire joint. Furthermore, the present product, during the application thereof to the field joint, insures that there will be a good thickness of hot coating on the bottom of the pipe, as well as all areas of the field joint, and is provided with means for lessening the amount of spillage of the poured hot coating. Finally, such a preformed product, which together with the poured material forms a reinforced coating for the joint, is very economical to manufacture and with the method involved in applying the article to the field joint, good wiping action of the hot poured coating over all areas of the field joint is obtained.

With the above in mind, it is an important object of this invention to provide an improved and simplified preformed product that may be used in coating a field joint of two abutting sections of pipe.

Another object of this invention is to provide an improved and simplified preformed product for use as a mold when pouring hot coatings on field joints of yard or mill coated pipe.

Yet another object of this invention is to provide an improved and simplified method for applying a protective coating to a field joint.

A further object resides in an improved and simplified method and product for coating a field joint of pipe sections which overcomes the difficulties of the prior art and which will permit application of the coating to be carried out quickly and efficiently and at a minimum of cost without requiring extensive pipe line machinery and crews and when applied will remain firmly sealed to the field joint and to the previously applied wrapping adjacent the joint.

Yet another object of this invention is to provide a preformed product of the type defined which is substantially rectangular in configuration and of a size preferably larger than that necessary to cover the field joint, there being provided in the product a substantial distance from the ends thereof a trough-like construction extending transversely, the purpose of which is to retain hot coating poured into the product, thereby preventing spillage and insuring when the product is wrapped around the field joint that the bottom thereof will be suitably coated with the hot coating.

The construction and method designed to carry out the invention will be hereinafter described, together with other features thereof, and will be more readily understood from a reading of the following specification and by reference to the accompanying drawing forming a part thereof wherein an example of the invention is shown and wherein:

Figure 1 is a perspective view illustrating the product of this invention about to be applied to a field joint;

Figure 2 is a top perspective view of the product of this invention;

Figure 3 is an enlarged top view of a portion thereof;

Figure 4 is an end view of the product in one of its application positions about the field joint with the pipe and wrapping of Figure 1 being in section;

Figure 5 is an end view of the product as positioned in Figure 6 with the pipe and wrapping illustrated in section; and Figure 6 is a bottom view of the product after application to the field joint.

Referring to the drawings in detail and first to Figure 1, there is disclosed a portion of a pipe line L supported on any suitable means such as the skids S and the line L includes two sections 1 and 2 which are welded together at 3. As explained, the majority of the pipe sections have wrapping W applied thereto, except at the area adjacent the joint 3, and this non-wrapped area is defined as the field joint F. The wrapping material W essentially comprises a layer of normally non-tacky, high melting material, such as coal tar, asphalt or micro-crystalline wax and this layer has embedded therein suitable reinforcements such as glass mat or a sheet of woven glass fabric. The product of the present invention, represented generally by the numeral 5 in Figures 1 and 2, is preferably constructed of the same material as the wrapping W so as to be chemically compatible therewith, although it should be mentioned that in addition the exterior or bottom surface of the product 5 should have secured thereto in any suitable manner a sheet of asbestos, felt or the like (not shown) which functions to protect the product 5 and any damage thereto such as during back filling of the pipe line L and also permits shipping of products 5 in nested relation without being concerned of their sticking together. More specifically, product 5 may be formed from suitable inorganic structures, such as, for example, glass or asbestos fibers in mat or fabric sheets, embedded within coal tar, asphalt or micro-crystalline wax, either of which have such characteristics as to produce a relatively stable and rigid member capable of maintaining a shaped form, unless acted on by external forces.

As shown, the body portion of product 5 is formed of a substantially rectangular shape and of a size to be wrapped around the field joint F with the ends 6 thereof in overlapping relationship, shown in Figure 5, and with the edges 7 spaced apart sufficiently to overlap part of the wrapping W as shown in Figure 1. By means of a press or other type of stamping operation there is formed in the molded body 5 substantially intermediate the ends 6 thereof and extending transversely between the edges 7, a trough T clearly shown in Figures 2 and 3. The stamping or press operation is such as to cause the trough to have a cylindrical top surface 8, the curvature of which is more pronounced, as illustrated, than the curvature of pipe line L. The surface 8 is generally rectangular in shape and the ends thereof are turned up to provide end walls 9 and 10 projecting above the curved surface 8. These end walls 9 and 10 follow the shape of curvature of surface 8 at each end thereof and flare outwardly and upwardly from the surface to form therewith a receptacle in the form of a shallow curved trough for holding a flowable material. The flaring upwardly and outwardly of the end walls 9 and 10 permit these walls to be compressed and slightly "broken down" away from the curved surface in a manner that will be described hereinafter. Although the entire product 5 in its molded form is relatively rigid and stable, the end walls 9 and 10 may be compressed and broken down, at least to a certain extent.

To apply the product 5 to the field joint F it is positioned substantially as shown in Figure 1 with one or more operators, depending upon the size of the joint or product, holding the ends 6 so that the product appears substantially as shown in Figures 1 and 4 with relation to the pipe line L and field joint F. Due to the sides of the product 5 resting on a portion of the wrapping W there is more or less of an annular space created between the field joint and the product 5 and within this space there is applied, by means of pouring on top of the joint F, hot liquid material M which is chemically compatible with the material of product 5 and wrapping W. For example, the poured material may be hot flowable coal tar, asphalt or microcrystalline wax, depending upon the essential ingredient of the wrapping and product 5. While this material is poured, the operators more or less wiggle or "granny rag" the product 5, which means that the product is moved back and forth slightly to cause the poured material to reach all portions of the joint F. It can be appreciated that before as well as during this "granny ragging" there would be bound to be spillage of the hot poured material toward the bottom of the product 5 if it were not for the trough T. This trough functions to cut down on spillage as it retains a certain amount therein and furthermore it insures that hot material will be applied to the bottom of the coating, which is important.

After the pouring and "granny ragging" is completed, the operators pull up on the ends 6 until trough T assumes the position of Figure 4 and in doing this the end walls 9 and 10 will be compressed and broken down and the hot material will be squeezed, resulting in this material M running over additional wrapping W as shown in Figure 6. By pulling up on the ends 6, the surface 8 will be moved closer to the bottom of the joint F to practically engage the curved surface of the joint F and flowable material will have been deposited throughout the joint and on top of adjacent portions of the wrapping. Thereafter the ends are positioned in overlapping relationship, as shown in Figure 5, or if desired these ends may be caused to abut one another instead of overlapping and it is apparent the hot flowable material causes the product 5 to more or less integrally unite to the wrapping W and joint F. Figures 5 and 6 illustrate the trough as still existing after the product 5 has been wrapped and also show in somewhat exaggerated fashion the end walls extending outwardly beyond the edges 7. In actuality the trough becomes compressed or substantially flattened so that its surface 8 is spaced from the joint F only slightly more than the rest of product 5 and the walls 9 hardly extend outwardly of edges 7. In other words, as a result of pulling up on ends 6 as illustrated in Figure 4, the depth of trough T is considerably reduced from that of Figure 2 and, the product 5 approaches the configuration had before the trough T was stamped therein.

It is believed from the foregoing that the relatively rigid product 5 and the method of application thereof to a field joint F or the like fully accomplish the objects and advantages outlined. Being aware of the possibility of equivalent modifications in the product and method described, we desire it to be understood that the scope of our invention is not to be limited except in accordance with the appended claims.

In the claims the term "field joint" is intended to cover its true meaning as well as other portions of a pipe line needing a coating, such as an area to be repaired.

What is claimed is:

1. A preformed product for use in coating a field joint of a pipe line having a wrapping previously applied thereto except at the field joint comprising a relatively rigid substantially rectangular body portion including material chemically compatible with the previously applied wrapping and being of a size to be wrapped about the field joint, a trough in said portion spaced a substantial distance from the ends of the body portion, said trough extending substantially transversely in the body portion and being of a size to encompass the bottom of the pipe when the portion is wrapped thereabout, said trough having a curved top surface with sides and ends, an end wall integrally mounted at each of said surface ends and following the shape of said surface curvature at each end thereof so as to form with the surface a receptacle in the form of a shallow curved trough for holding flowable material having an affinity to the wrapping and portion, said end walls flaring outwardly from the surface.

2. A product as defined in claim 1 wherein the end walls are made of compressible material.

3. A product as defined in claim 2 wherein the body portion is made from a substance selected from the group consisting of coal tar, asphalt and microcrystalline wax and has embedded therein fibrous structure to give stability thereto.

4. A product as defined in claim 2 wherein the trough is of a size capable of maintaining sufficient flowable material to insure some thereof being applied to the bottom of the pipe and surrounding areas when said end walls are compressed.

5. A preformed product for use in coating a field joint of a pipe line having a wrapping previously applied thereto except at the field joint comprising a relatively rigid body portion including material chemically compatible with the previously applied wrapping and being of a size to be wrapped about the field joint, said body portion including ends and side edges, a relatively small trough in said portion spaced a substantial distance from the ends of the body portion, said trough extending substantially transversely in the body portion and being of a size to encompass the bottom of the pipe when the portion is wrapped thereabout, said trough having a curved top surface with sides and ends, an end wall integrally mounted at each of said surface ends so as to form with the surface a receptacle in the form of a shallow curved trough for holding flowable material having an affinity to the wrapping and portion.

6. A preformed product as defined in claim 5 wherein the end walls are connected to the surface to flare outwardly and upwardly therefrom and are made of compressible material.

7. A preformed product as defined in claim 6 wherein the trough is of a size capable of maintaining sufficient flowable material to insure some thereof being applied to the bottom of the pipe and surrounding areas when the end walls are compressed.

8. A preformed product for use in coating a field joint of a pipe line comprising a relatively rigid body portion of a size to be wrapped about the field joint, a relatively small trough in said portion spaced a substantial distance from the ends of the body portion, said trough extending substantially transversely in the body portion adjacent the longitudinal center thereof and being of a size to encompass part of the bottom of the pipe when the portion is wrapped thereabout, said trough having a curved top surface with sides and ends, an outwardly flared and upwardly extending end wall integrally mounted at each of said surface ends so as to form with the surface a receptacle in the form of a shallow curved trough for holding flowable material having an affinity to the portion, said end walls being compressible by the application of force.

9. A new method of coating a field joint of a pipe line having a wrapping previously applied thereto except at the field joint which comprises providing and substantially surrounding the joint with a relatively rigid substantially rectangular body portion including material chemically compatible with the previously applied wrapping and being of a size to be wrapped about the joint, said body portion being further constructed to have a shallow curved trough therein spaced a substantial distance from the ends of the body portion with the trough facing and being adjacent the bottom of the joint and the ends adjacent but spaced from the top in the general configuration of a U when the portion substantially surrounds the joint, said trough extending substantially transversely thereof and being of a size to encompass part of the bottom of the joint, said trough having a curved top surface with sides and end walls, pouring on top of the joint and into the U a flowable material having an affinity to the applied wrapping and portion whereby the flowable material accumulates in said trough and on said joint, applying forces to the portion to compress the end walls and bring the curved surface of the trough into substantial contact with the joint and wrapping the ends of the portion about the joint whereby the portion will adhere to the joint.

10. A new method of coating a field joint of a pipe line comprising the steps of first providing and substantially surrounding the joint with a relatively rigid body portion of a size to be wrapped about the joint and having a shallow curved trough therein spaced a substantial distance from the ends of the portion with the trough facing and being adjacent the bottom of the joint and the ends adjacent but spaced from the top in the general configuration of a U when the portion substantially surrounds the joint, said trough extending transversely thereof and being of a size to encompass part of the bottom of the joint, said trough having a curved top surface with sides and end walls, thereafter pouring on top of the joint and into the U the flowable material whereby the material accumulates in said trough and on said joint, applying forces to the portion to compress the end walls and bring the curved surface of the trough into substantial contact with the joint, and finally wrapping the ends of the portion about the joint whereby the portion will adhere to the joint.

References Cited in the file of this patent

UNITED STATES PATENTS

| Number | Name | Date |
|---|---|---|
| 1,787,492 | Rasmussen | Jan. 6, 1931 |
| 1,823,974 | Ferguson | Sept. 22, 1931 |
| 1,883,305 | Kinzbach | Oct. 18, 1932 |
| 2,125,208 | Bray et al. | Nov. 1, 1938 |
| 2,188,001 | Duaei et al. | Jan. 23, 1940 |
| 2,344,264 | Perrault | Mar. 14, 1944 |